United States Patent [19]
Romano

[11] Patent Number: 5,470,277
[45] Date of Patent: Nov. 28, 1995

[54] POWER OPERATED GEAR CHANGE ASSEMBLY FOR BICYCLES

[75] Inventor: Antonio Romano, Padova, Italy

[73] Assignee: Campagnolo S.r.l., Vicenza, Italy

[21] Appl. No.: 257,148

[22] Filed: Jun. 9, 1994

[30] Foreign Application Priority Data

Jul. 8, 1993 [IT] Italy ................... T093A0503

[51] Int. Cl.⁶ ...................... F16H 9/00; F16H 59/00
[52] U.S. Cl. .................. 474/70; 474/81; 474/110
[58] Field of Search .................. 474/70, 78–81, 474/110; 180/343

[56] References Cited

U.S. PATENT DOCUMENTS

| | | | |
|---|---|---|---|
| 3,863,512 | 2/1975 | Crawley | 474/110 X |
| 3,919,891 | 11/1975 | Stuhlmuller et al. | 474/82 X |
| 4,041,788 | 8/1977 | Nininger | 474/110 X |
| 4,605,240 | 8/1986 | Clem et al. | 474/80 X |
| 4,946,425 | 8/1990 | Buhlmann | 474/80 |
| 5,059,158 | 10/1991 | Bellio et al. | 474/110 X |
| 5,213,548 | 5/1993 | Colbert et al. | 474/110 X |
| 5,254,044 | 10/1993 | Anderson | 474/80 X |
| 5,356,348 | 10/1994 | Bellio et al. | 474/70 |
| 5,357,177 | 10/1994 | Fey et al. | 474/110 X |

*Primary Examiner*—Roger J. Schoeppel
*Attorney, Agent, or Firm*—Sughrue, Mion, Zinn, Macpeak & Seas

[57] ABSTRACT

A power operated gear change assembly for bicycles, which includes a gear change whose derailleur is displaceable by an electric geared motor and associated power supply accumulator, operated through a manual control device or detector for detecting the derailleur displacement, and a control circuit for controlling operation of the electric geared motor. The electric geared motor is directly fitted on the derailleur of the gear change, and the detector includes a transducer device placed in a remote position relative to the derailleur of the gear change and operatively connected thereto through a transmission device. The electric accumulator is rechargeable by means of a dynamo-electric unit incorporated in the derailleur of the gear change.

17 Claims, 6 Drawing Sheets

POWER OPERATED GEAR CHANGE ASSEMBLY FOR BICYCLES

BACKGROUND OF THE INVENTION

The present invention is related to a power operated gear change assembly for bicycles, of the type comprising a gear change having a plurality of sprocket pinions, arranged coaxially to one another, having different diameters and selectively engageable by an endless chain; a derailleur displaceable into a plurality of positions each corresponding to engagement of the chain with a respective sprocket pinion; a powered actuator for performing displacement of the derailleur through said plurality of positions; manual control means for controlling said actuator; detecting means for detecting displacement of the derailleur; and control means operatively associated to said detecting means for controlling the operation of said actuator, and wherein the powered actuator is a d.c. electric motor with associated power supply accumulator.

A gear change assembly of the above specified type is known for instance from EP-A-0529664, according to which the electric motor operates the derailleur of the gear change through a Bowden-cable flexible transmission. A similar system is also provided for operating a front derailleur, associated to a series of sprocket wheels, which is also employing an electric motor connected to the front derailleur through a Bowden-cable transmission. The two electric motors are provided with fittings for securing thereof to the frame of a bicycle.

This arrangement has several drawbacks: firstly the mounting of the assembly, and in particular of the motor-driven actuators of the rear and front derailleurs, requires relative long and delicate operations, in particular as far as the adjustment of the respective flexible cable transmissions is concerned.

Secondly, since in practice the two derailleurs of the assembly have a conventional structure, i.e. with respective return springs, the power required for displacement thereof is relatively high, which involves employing motors and associated power supply accumulators having a relatively large size, and thus relatively heavy.

Lastly the size itself of the motors and of the accumulators, as well as their positioning on a bicycle frame, involve troublesome encumbrances and protrusions.

The above drawbacks are particularly critical in case the known motor-driven gear change assembly is applied on racing bicycles, which require simple and quick adjustments and, above all, as reduced as possible weight and encumbrances.

It is also known from DE-A-39 38 454 an assembly of the above-referenced type, which gives a partial solution to the problem related to the encumbrance of the power operated assembly, by virtue of the fact that the motor-driven actuator is directly carried by the rear derailleur. While the traditional return spring of the derailleur, and thus the relative reaction force, can be accordingly suppressed, the power operated system contemplated in this case is of electric-hydraulic type, which involves employing auxiliary equipment and, consequently, a complicated construction together with weight and encumbrance even greater than in the case of the previously described known solution. Moreover this arrangement involves precision problems in connection with the system for detecting the derailleur displacements.

SUMMARY OF THE INVENTION

The object of the present invention is to avoid the above drawbacks, and to provide a power operated gear change assembly for bicycles of the type defined at the beginning, which is adapted to be manufactured and assembled in a simple and relatively economical way, employing a low-power motorization and thus with reduced weight and size, and having an encumbrance almost identical to that of a conventional manually-driven gear change assembly.

According to the invention, these objects are achieved essentially by virtue of the following combination of features:

the electric motor is directly fitted on the derailleur, the detecting means comprise a transducer device arranged in a remote position relative to the derailleur and having a movable element, and a transmission member interconnecting said movable element of the transducer device and the derailleur.

Said transmission member may conveniently comprise a Bowden-cable or the like, having one end adjustably connected to the derailleur and the opposite end of which defines the movable element of a linear transducer.

The transducer device is advantageously housed within a support body adapted to be secured to a bicycle frame, and said control means may normally comprise a microprocessor integrated unit housed within said support body.

According to another advantageous feature of the invention, the electric accumulator is of rechargeable type and the gear change incorporates a dynamo-electric unit for recharging the accumulator. Recharging may also be carried out by means of photovoltaic cells.

Normally the derailleur of the gear change comprises a stationary body intended to be fixed onto a bicycle frame, and a rocker-arm movable body connected to the stationary body and carrying idle wheels for the chain: in this case the dynamo-electric unit may advantageously be incorporated within at least one of the said idle wheels of the rocker-arm body.

The gear change assembly may further comprise a front derailleur with associated sprocket wheels, arranged coaxially to each other, having different diameters and adapted to be selectively engaged by the endless chain, wherein the front derailleur can be displaced into a plurality of positions each corresponding to engagement of the chain with a respective sprocket wheel. In this case a second d.c. electric motor is provided for performing displacement of the front derailleur through said plurality of positions, and said second electric motor is directly applied on said front derailleur.

The second electric motor is normally supplied by the same electric accumulator for the power supply of the electric motor associated to the gear change, and said microprocessor unit also controls operation of the second electric motor. This microprocessor unit is advantageously designed so as to automatically control, through said second electric motor and independently of operation of the manual control means thereof, corrective displacements of the front derailleur.

These automatic corrective displacements enable properly positioning the front derailleur, so as to avoid any interference with the chain when the latter is positioned by means of the gear change in correspondence of the end sprocket pinion or pinions, corresponding to the lower or higher speed ratio or ratios, respectively.

According to a further aspect of the invention, said manual control means comprise two control members intended to be associated with a bicycle brake control lever assembly and adapted to generate electric pulses supplied to said control means. The two control members are preferably, but not necessarily, constituted by a lever and by a push button, respectively.

BRIEF DESCRIPTION OF THE DRAWINGS

The invention will now be disclosed in detail with reference to the accompanying drawings, purely provided by way of non limiting example, wherein.

DETAILED DESCRIPTION OF THE INVENTION

Figure 1:
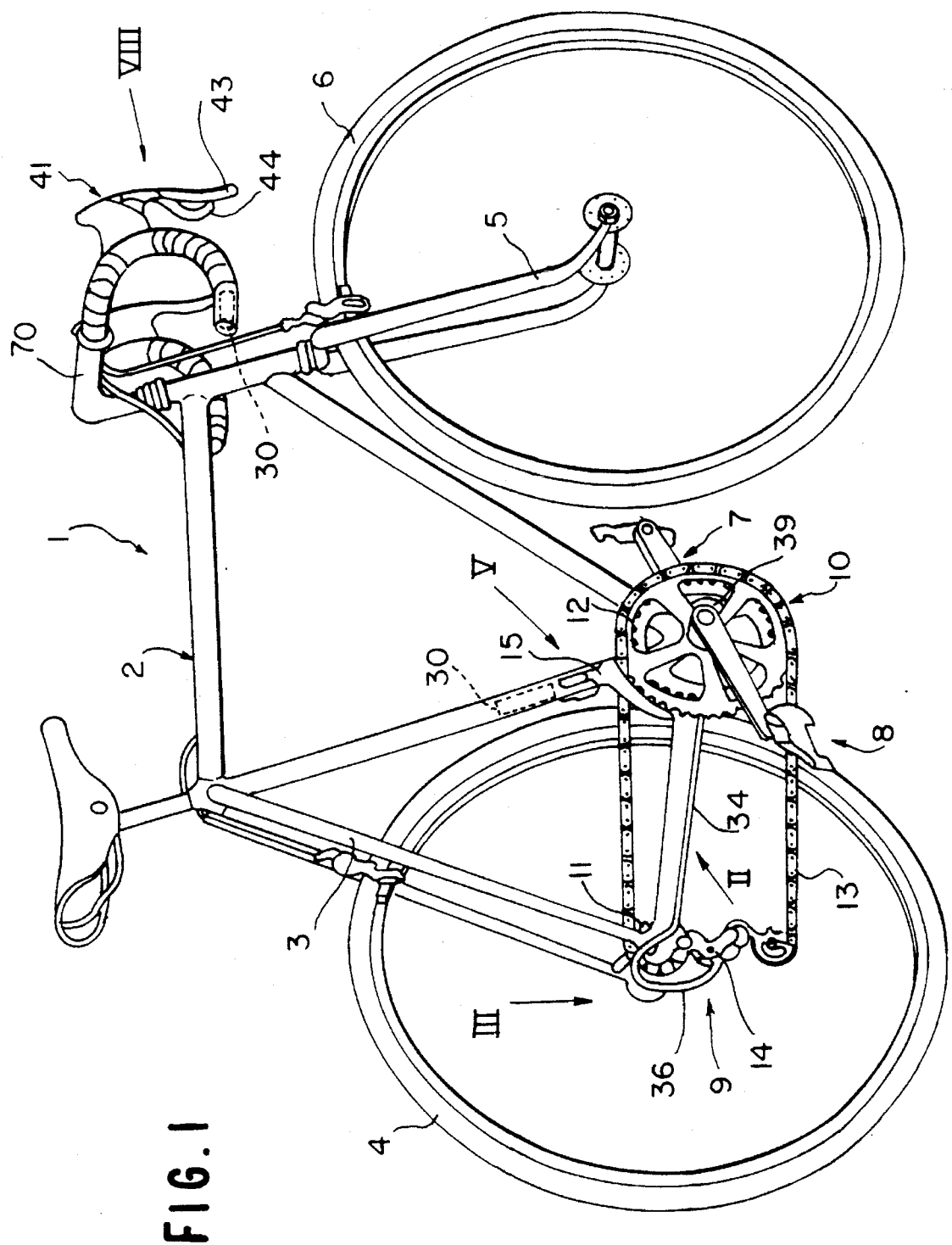
FIG. 1 is a diagrammatic perspective view of a bicycle provided with a motor-driven gear change assembly according to the invention.

Referring initially to FIG. 1, reference numeral 1 generally designates as a whole a racing bicycle, essentially comprising a frame 2 constituted in a way known per se by tubular elements defining a support structure 3 of a rear wheel 4 and a fork 5 for a front wheel 6, to which a handle bar 70 also having a tubular construction is associated.

The frame 2 carries inferiorly a crank axle or pedal assembly 7, of a generally conventional type, for driving the rear wheel 4 via a power operated gear change assembly according to the invention, generally designated as 8.

The gear change assembly 8 is essentially formed by a rear gear change 9 and a front gear change 10 comprising, in a generally known way, the first one a plurality of sprocket pinions 11 (in the example eight pinions are shown) of different diameters and arranged coaxially to the axis A of the rear wheel 4, and the second one a series of sprocket wheels 12 (in the example two wheels are shown) of different diameters and arranged coaxially to the axis B of the crank axle 7.

The sprocket pinions 11 and the sprocket wheels 12 are selectively engageable by an endless transmission chain 13, so as to provide the different speed ratios available through of the gear change assembly 8, by means of the displacement of a rear derailleur 14 of the rear gear change 9 and of a derailleur 15 of the front gear change 10, respectively.

Figure 2:
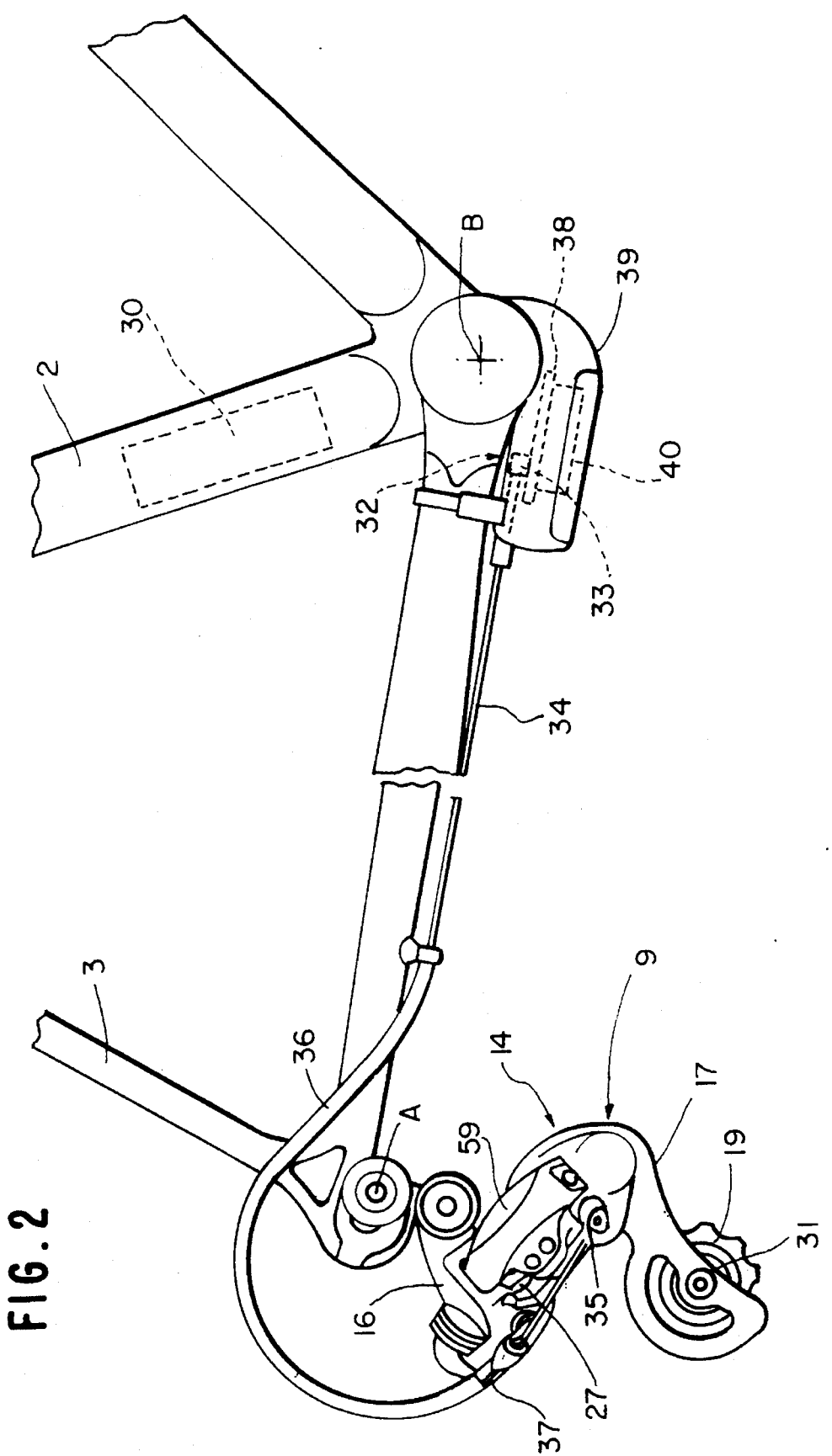
FIG. 2 is a side elevational, fragmentary and enlarged view of the detail indicated by arrow II in FIG. 1.
Figure 3:
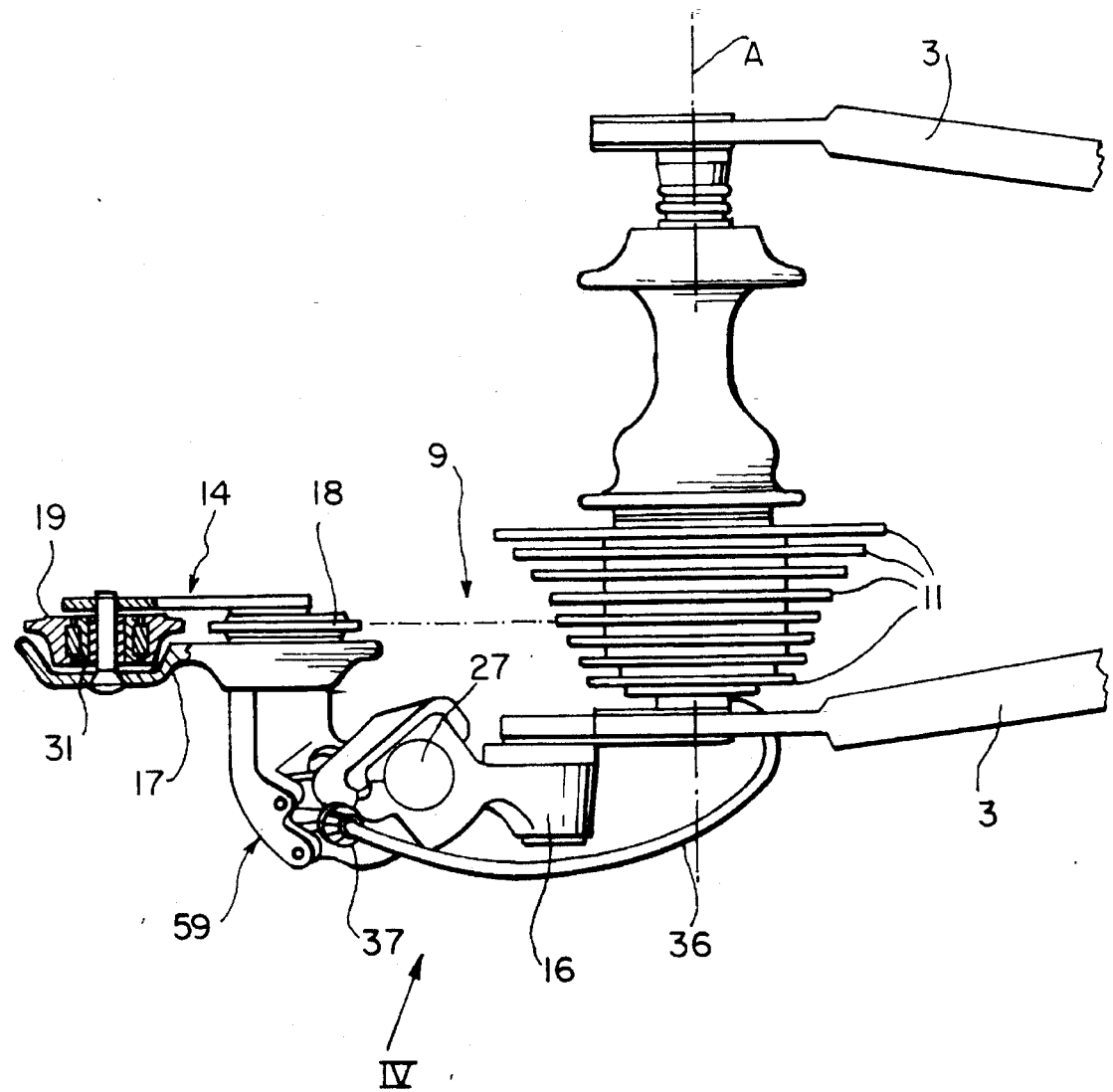
FIG. 3 is a rear, partially sectioned and enlarged view according to arrow III of FIG. 1.
Figure 4:
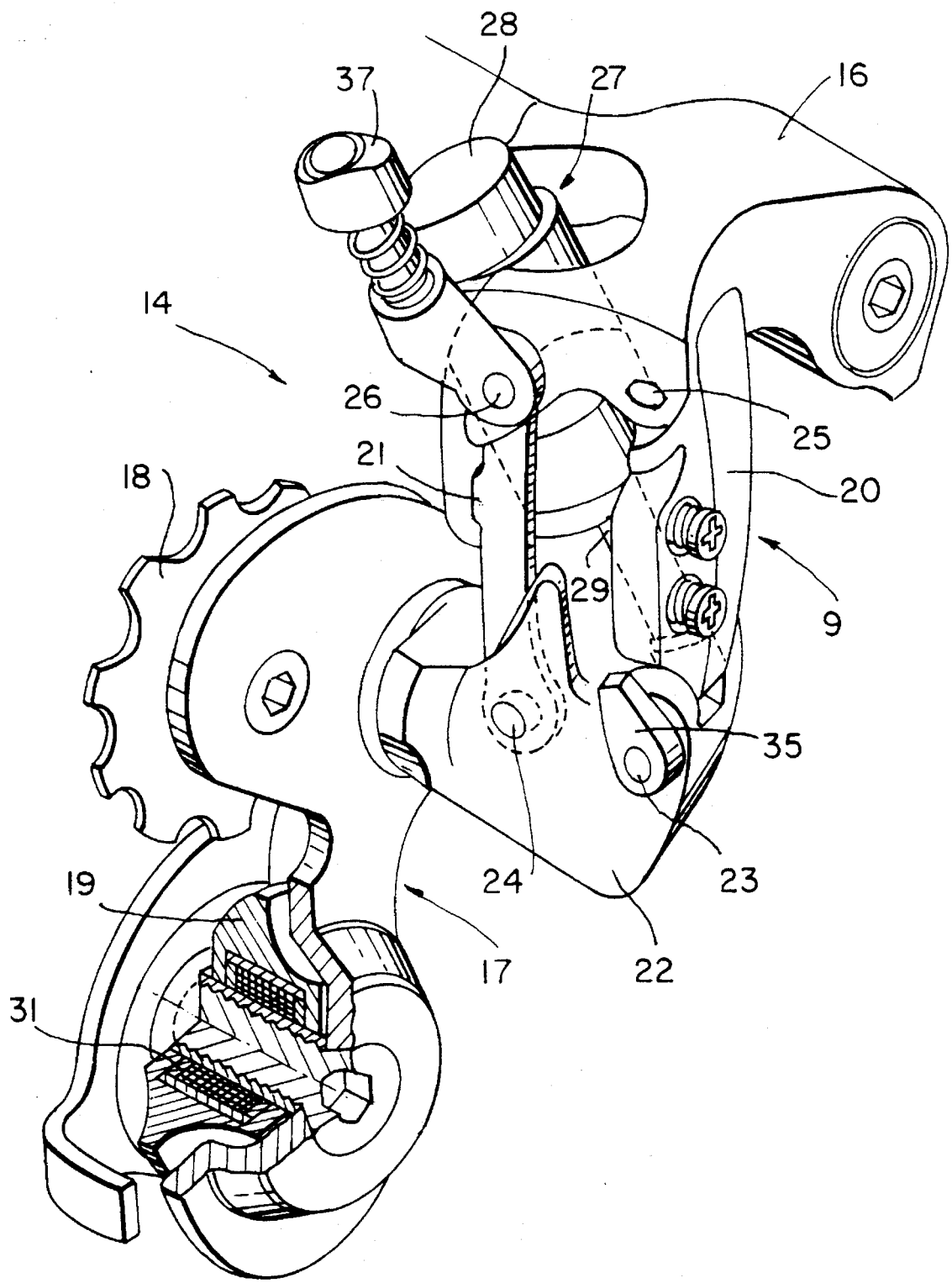
FIG. 4 is a perspective and enlarged view of the detail indicated by arrow IV in FIG. 3.

Referring now in better detail to FIG. 2 (in which for the sake of simplicity of illustration the sprocket pinions 11, the chain 13, the rear wheel 4 and the crank axle 7 have been omitted) and to FIGS. 3, 4, the derailleur 14 of the rear gear change 9 comprises, in a generally conventional way, a stationary body 16 adapted to be secured to the rear structure 3 of the frame 2 of the bicycle 1, and a rocker arm movable body 17 carrying idle wheels 18, 19 for the chain 13 and connected to the stationary body through an articulated parallelogram structure 59, including two arms 20, 21 articulated inferiorly to a mount portion 22 of the rocker arm 17 by means of respective pivot pins 23, 24, and superiorly to the body 16 by means of respective pivot pins 25, 26.

Reference numeral 27 designates a d.c. electric geared motor, intended to be supplied at a 6 V voltage, directly incorporated in the derailleur 14 for operating displacement of the rocker arm 17 through the various engagement positions of the chain 13 with the respective sprocket pinions 11.

The geared motor 27, which may be for example of the type manufactured and marketed by S. A. Minimotor under the trade designation 1319E006 S, comprises a body 28 containing the reduction gear with a linear translation mechanism (normally of the screw and nut type) of an output shaft 29. The body 28 is pivoted onto the stationary body 16 around the axis of the pin 26, and the free end of the output shaft 29 is pivoted on the rocker arm 17 around the axis of pin 23. According to this arrangement, the electric geared motor 27 is consequently placed along a diagonal of the articulated parallelogram structure 59.

The power supply of the geared motor 27 is provided by an accumulator 30 which is conveniently housed within one of the tubes of frame 2 or, as an alternative, within one of the arms of the handle bar 70, or even within the microprocessor box. The accumulator 30 is connected to the geared motor 27 through leads (not shown in the drawings) conveniently housed within the same tubes of the frame 2.

According to one aspect of the invention, the accumulator 30 is of the rechargeable type, and the rear gear change 9 incorporates a dynamo-electric unit for recharging thereof. As it is shown in detail in FIGS. 3 and 4 this dynamo-electric unit, generally indicated as 31, is incorporated within one of the idle wheels of the rocker arm 17, conveniently within idle wheel 19, and is electrically connected to the accumulator 30 through leads (not shown in the drawings) conveniently extending along the tubes of the frame 2.

In order to detect the displacement of the derailleur 17 operated by the geared motor 27, to the aim of providing operation control of the latter, according to another aspect the invention provides a transducer device generally designated as 32 in FIG. 2, placed in a remote position with respect to the rear gear change 9. This device is constituted by a linear transducer of known type, whose movable element is defined by one end 33 of a Bowden-cable transmission 34 or the like, the opposite end of which is anchored at 35 to the portion 22 of the rocker arm 17. The cable 34 is guided in part within a flexible sheath 36, having an adjustment register 37, carried by the body 16 of the rear derailleur 14. The anchoring element 35, the sheath 36 and the register 37 constitute usual components employed in conventional rear derailleurs normally operated by a flexible cable transmission. Thus, in practice, it is possible to substantially employ the already existing components of such a conventional derailleur, with the only modification consisting of the provision of the geared motor 27 and the suppression of the conventional return spring. This is made possible also by virtue of the fact that the system for detecting and controlling operation of the electric geared motor 27 is brought, via the cable 34 and the linear transducer 32, outside the rear gear change 9. It is however to be pointed out in this connection that the linear transducer 32 may be constituted by an equivalent apparatus, including for example photodiodes or the like.

The stationary member of the linear transducer 32, generally designated as 38, is lodged within a housing 39, which is in turn secured to the structure of the frame 2 of the bicycle 1 in the area of the crank axle 7, or in the area above the rear brake, and also containing an integrated microprocessor control unit diagrammatically shown as 40.

The unit 40, which may be for example of the type marketed by NEC under trade designation PD75P54, performs control of the electric geared motor 27 operation, through the detecting signals of the position each time taken by the rocker arm 10, which signals are supplied by the linear transducer 32.

Figure 8:
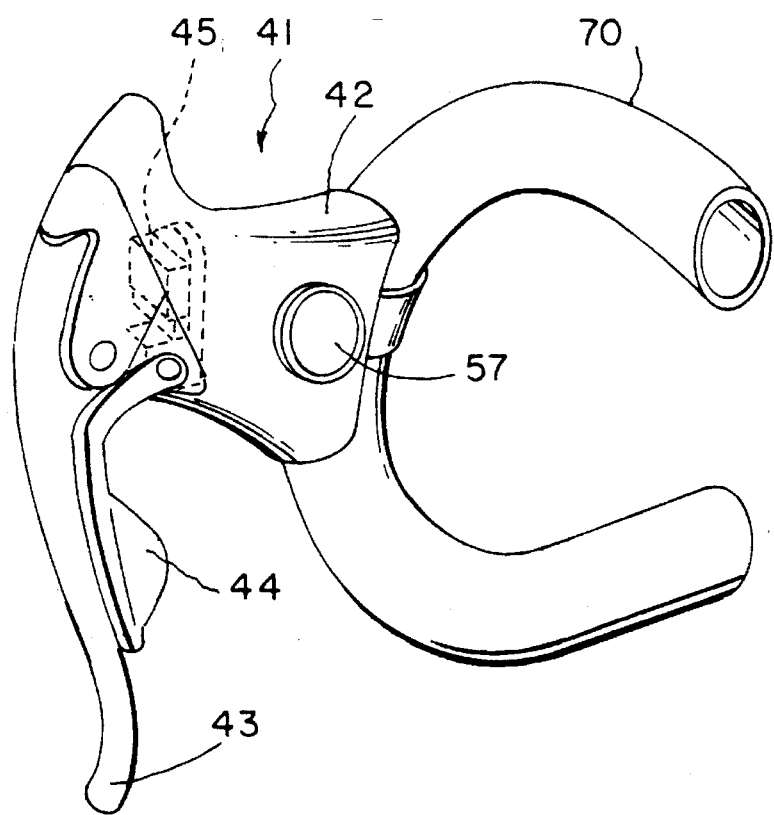
FIG. 8 is a perspective and enlarged view of the detail indicated by arrow VIII in FIG. 1.

The control unit 40 is inputted with signals or pulses for energising the electric geared motor 27, which are supplied by a manual control assembly which may be conveniently associated to a brake lever assembly 41 of one of the (rear or front) brakes of the bicycle 1. As it is better depicted in FIG. 8, the control assembly 41 conventionally comprises a support 42 fixed to the handle bar 7, and a swinging lever 43 pivoted onto the support 42 and operable so as to control, via a conventional flexible cable transmission, brake operation. The control system for operating the electric geared motor 27 of the rear gear change 9 conveniently comprises a swinging lever 44 and a push button 57. The lever 44 is pivoted on the back side of the brake control lever 43, and can be displaced so as to operate the geared motor 27 in one direction, corresponding for instance to derailment of the chain 13 towards higher (or lower) speed ratios. Operation of the push button 57 performs activation of the geared motor 27 in the opposite direction, corresponding to derailment of the chain 13 towards lower (or respectively higher) speed ratios.

Operation of the lever 44 or of the push button 57 produces corresponding electric signals or pulses supplied to the microprocessor unit 40. These pulses may be generated through an electric switch 45 connected to the unit 40 by respective wires (not shown), or alternatively by a radio or infrared ray wireless control, or by equivalent systems.

According to a further alternative embodiment, the control system may employ a numerical keyboard, adapted to directly select the desired speed ratio, and possibly provided with a display controlled by the microprocessor 40 for displaying the selected speed ratio.

In any case the variation of the speed ratio provided by the gear change 9 may be of discrete or stepped type, which requires for each speed change shifting a corresponding operation of the control lever 40 or of the push button 57, or of continuous type. In the latter case provision may be made that, if the control lever 44 or the push button 57 is maintained for a predetermined time in a position displaced relative to the rest position, a corresponding continuous activation of the geared motor 27 is carried out until reaching the desired speed ratio.

The principles previously disclosed with reference to the rear gear change 9 are preferably, but not necessarily, also applied to the front gear change 10.

Figure 5:
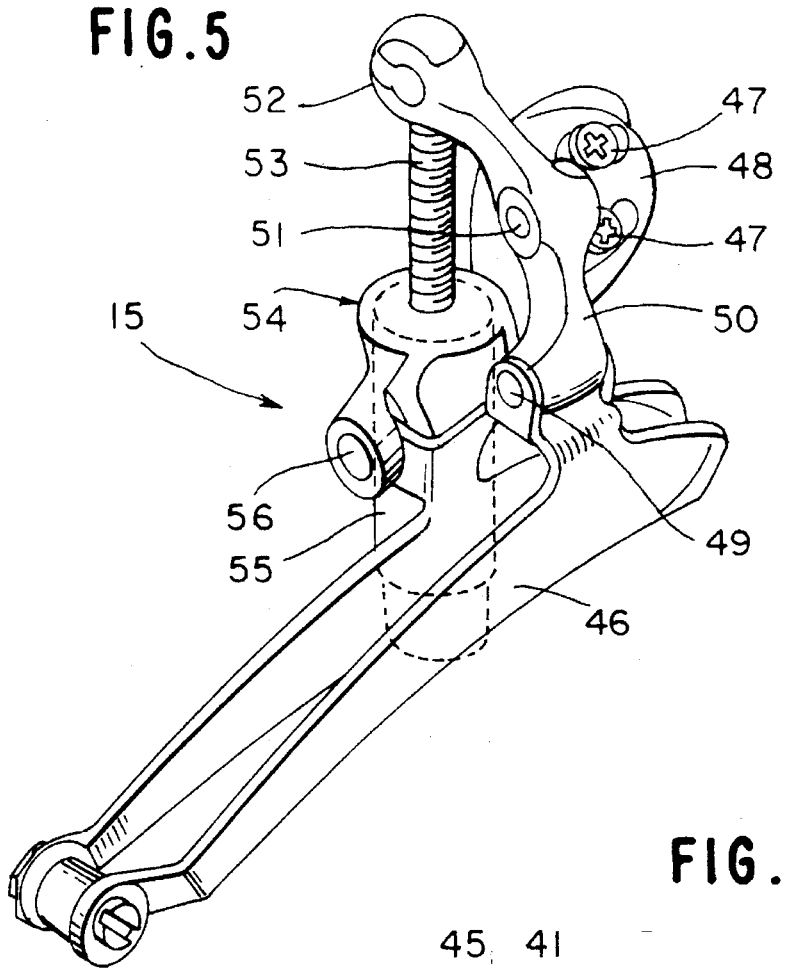
FIG. 5 is a perspective and enlarged view of the detail indicated by arrow V in FIG. 1, FIGS. 6 and 7 are two top plan views in a reduced scale, showing the detail of FIG. 5 in two different operating positions.

Referring in better detail to FIG. 5, the derailleur 15 of the front gear change 10 comprises, in a generally conventional way, a guide fork 46 swingably carried by a support 48 which is in turn adapted to be secured to the frame 2 of the bicycle 1, above the crank axle 7. The fork 46 is pivoted around a pin 49 of a rocker lever 50 which is centrally articulated at 51 onto the support 48. The free end of the output shaft 53 of an electric geared motor 54 is articulated at 52 onto the opposite end of the rocker lever 50. The motor 52 is identical to the geared motor 57, and the body 55 thereof is articulated at 56 onto the fork 46.

The power to the electric geared motor 54 is supplied (through leads which are not shown) by the same rechargeable accumulator 30, and energising thereof is controlled by the same microprocessor unit 40 by means of activation signals provided by a manual control assembly, for instance constituted by a lever 44 and by a push button 57 carried by the support 42 of the lever 43 associated to the other bicycle brake. The arrangement is same as that previously disclosed in connection with the rear gear change 9, with reference to FIG. 8. Also in this case the push button 57 and the lever 44 are operated so as to generate electric signals or pulses transmitted to the microprocessor unit 40, which controls also operation of the geared motor 54.

The system for detecting the displacement of the front derailleur 15, and thus for controlling operation of the geared motor 54 performed by the microprocessor unit 40, may be comprised simply of limit switches (not shown but within the knowledge of the man skilled in the art), or by photodiode systems or the like, or by means of a remote linear transducer similar to the transducer 32, with a flexible cable transmission similar to the Bowden-cable 40 or the like, or even by means of simple adjustable mechanical stops 47 (see FIG. 5), which are also within the knowledge of the man skilled in the art. The last solution can be conveniently employed in case, as in the shown example, the front gear change 10 has only a pair of sprocket wheels 12.

In any case, according to a further feature of the invention, the microprocessor unit 40 is designed (following pre-programming expedients within the knowledge of the man skilled in the art) so as to perform a supplementary function consisting of automatically operating, by means of the electric geared motor 27 and independently of actuation of the corresponding push button 57 or lever 48, corrective displacements of the front derailleur 15.

Figure 6:
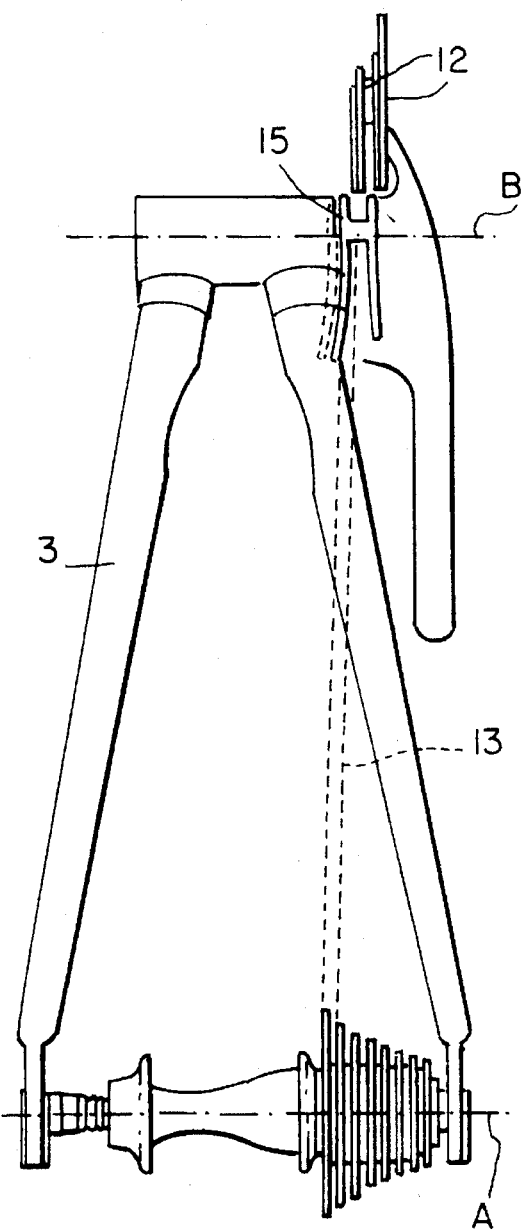
Figure 7:
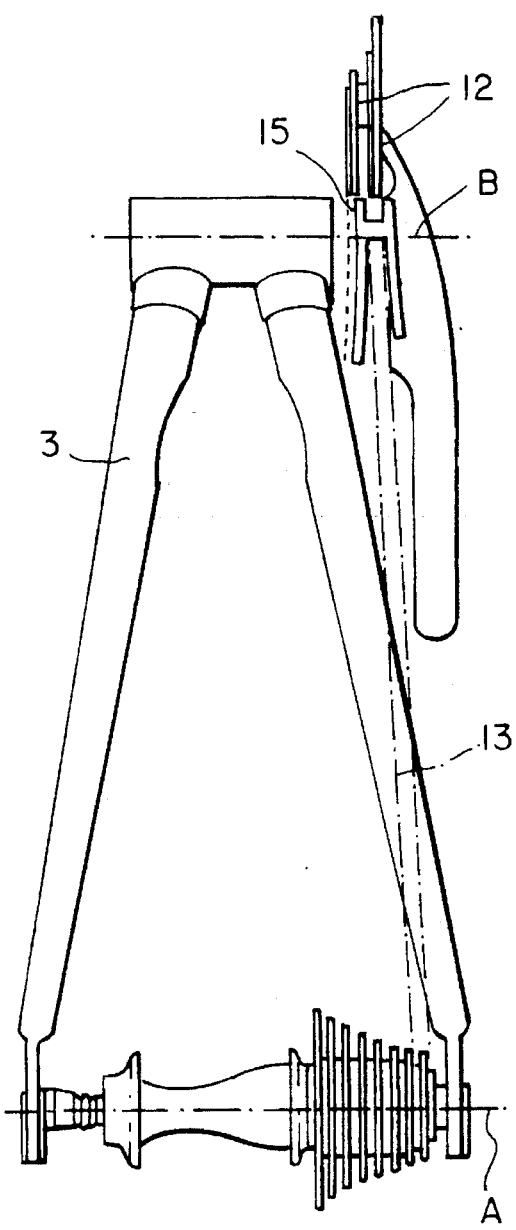

This supplementary function is diagrammatically explained in FIGS. 6 and 7, showing the positions taken by the chain 13 in the extreme positions corresponding to the lowest and to the highest speed ratio, respectively, of the rear gear change 9. As it is well known, the configuration of the guide fork 46 of the front derailleur 15 is such that, if the latter is not displaced when the chain 13 is derailed from one to the other extreme positions relative to the sprocket pinions 11 of the rear gear change 9, a sliding interference occurs between the fork 46 and the chain 13 itself when the latter is placed in the other extreme position relative to the rear gear change 9.

To avoid this drawback in such a case, the microprocessor unit 40, by means of the detecting signals supplied by the transducer 32 or, more simply, even by means of the control of the current input of the geared motor 27 in one or in the other limit stop position thereof, automatically operates energising of the electric geared motor 54 in one direction, or respectively in the opposite direction, so as to perform a corresponding corrective displacement of the fork 46 of the front derailleur 15, from the position shown in FIG. 6 to the position shown in FIG. 7, and vice versa. This corrective displacement consists of a translation of the fork 46 along a predetermined travel, for instance of about 2 mm., on one side or on the opposite side.

Naturally, the details of construction and the embodiments of the invention may be widely varied with respect to what has been disclosed and illustrated, without thereby departing from the scope of the present invention such as defined in the appended claims.

I claim:

1. A power operated gear change assembly for bicycles, comprising an endless chain, a plurality of sprocket pinions arranged coaxially to one another, having different diameters and selectively engageable by said endless chain, a derailleur displaceable into a plurality of positions each corresponding to engagement of the chain with a respective sprocket pinion, a powered actuator for performing displacement of the derailleur through said plurality of positions, manual control means for operating said actuator, detecting means for detecting displacement of the derailleur, and control means operatively associated to said detecting means and controlling operation of said actuator, wherein the powered actuator is a d.c. electric motor with associated power supply accumulator, and wherein:

the electric motor is directly fitted on the derailleur, the detecting means comprise an electromechanical transducer device arranged in a remote position relative to the derailleur and having a movable member, and a transmission member interconnecting said movable member of the transducer device and the derailleur;

said accumulator is of rechargeable type and the gear change incorporates a dynamo-electric unit for recharging said accumulator, the derailleur of the gear change comprises a stationary body intended to be fixed onto a bicycle frame, and a rocker arm movable body connected to the stationary body and carrying idle wheels for the chain, and said dynamo-electric unit is incorporated within at least one of said idle wheels of the rocker-arm body.

2. Assembly according to claim 1, wherein the transducer device includes a linear transducer having a movable element and the transmission member comprises a Bowden-cable having one end adjustably connected to the derailleur and the opposite end defining the movable element of said linear transducer.

3. Assembly according to claim 1, comprising a support body adapted to be secured to a bicycle frame and housing said transducer device.

4. Assembly according to claim 3, wherein said control means comprise a microprocessor integrated unit housed within said support body.

5. A power operated gear change assembly for bicycles, comprising an endless chain, a plurality of sprocket pinions arranged coaxially to one another, having different diameters and selectively engageable by said endless chain, a derailleur displaceable into a plurality of positions each corresponding to engagement of the chain with a respective sprocket pinion, a powered actuator for performing displacement of the derailleur through said plurality of positions, manual control means for operating said actuator, detecting means for detecting displacement of the derailleur, and control means operatively associated to said detecting means and controlling operation of said actuator, wherein the powered actuator is a d.c. electric motor with associated power supply accumulator, and wherein:

the electric motor is directly fitted on the derailleur, the detecting means comprise an electromechanical transducer device arranged in a remote position relative to the derailleur and having a movable member, and a transmission member interconnecting said movable member of the transducer device and the derailleur;

the derailleur of the gear change comprises a stationary body adapted to be fixed to a bicycle frame, a rocker arm movable body, and an articulated parallelogram assembly connecting the rocker arm to the body, and said electric motor is arranged along a diagonal of said articulated parallelogram assembly.

6. Assembly according to claim 5, wherein the transducer device includes a linear transducer having a movable element and the transmission member comprises a Bowden-cable having one end adjustably connected to the derailleur and the opposite end defining the movable element of said linear transducer.

7. Assembly according to claim 5, comprising a support body adapted to be secured to a bicycle frame and housing said transducer device.

8. Assembly according to claim 7, wherein said control means comprise a microprocessor integrated unit housed within said support body.

9. Assembly according to claim 5, wherein said accumulator is of rechargeable type and the gear change incorporates a dynamo-electric unit for recharging said accumulator.

10. A power operated gear change assembly for bicycles, comprising an endless chain, a plurality of sprocket pinions arranged coaxially to one another, having different diameters and selectively engageable by said endless chain, a derailleur displaceable into a plurality of positions each corresponding to engagement of the chain with a respective sprocket pinion, a powered actuator for performing displacement of the derailleur through said plurality of positions, manual control means for operating said actuator, detecting means for detecting displacement of the derailleur, and control means operatively associated to said detecting means and controlling operation of said actuator, wherein the powered actuator is a d.c. electric motor with associated power supply accumulator, wherein the electric motor is directly fitted on the derailleur;

wherein the detecting means comprise an electromechanical transducer device arranged in a remote position relative to the derailleur and having a movable member, and a transmission member interconnecting said movable member of the transducer device and the derailleur; and further comprising a front derailleur with associated sprocket wheels arranged coaxially to one another, having different diameters and adapted to be selectively engaged by said endless chain, said front derailleur being displaceable into a plurality of positions each corresponding to the engagement of the chain with a respective sprocket wheel, a second powered actuator for performing displacement of the derailleur through said plurality of positions, manual control means for operating said second actuator, and control means of said second actuator, wherein said second actuator is a d.c. electric motor with associated power supply accumulator and is directly fitted on the front derailleur.

11. Assembly according to claim 10, wherein said accumulator associated to the second electric motor is the electric accumulator for the power supply to the electric motor of said gear change.

12. Assembly according to claim 10, wherein said microprocessor unit also controls operation of the second electric motor and is designed so as to automatically perform, through said second motor and independently of activation of said manual control means, corrective displacements of said front derailleur.

13. A power operated gear change assembly for bicycles, comprising an endless chain, a plurality of sprocket pinions arranged coaxially to one another, having different diameters and selectively engageable by said endless chain, a derailleur displaceable into a plurality of positions each corresponding to engagement of the chain with a respective sprocket pinion, a powered actuator for performing displacement of the derailleur through said plurality of positions, manual control means for operating said actuator, detecting means for detecting displacement of the derailleur, and control means operatively associated to said detecting means and controlling operation of said actuator, wherein the powered actuator is a d.c. electric motor with associated power supply accumulator, and wherein:

the electric motor is directly fitted on the derailleur, the detecting means comprise an electromechanical transducer device arranged in a remote position relative to the derailleur and having a movable member, and a transmission member interconnecting said movable member of the transducer device and the derailleur; and said manually operable control means comprises at least two control members adapted to be associated with a control lever assembly of a bicycle brake, and means for pulse generation operatively connected to said control means.

14. Assembly according to claim 13, wherein said two control members are constituted by a swinging lever and by a push button, respectively.

15. A power operated gear change assembly for bicycles, comprising an endless chain, a plurality of sprocket pinions arranged coaxially to one another, having different diameters and selectively engageable by said endless chain, a derailleur displaceable into a plurality of positions each corresponding to engagement of the chain with a respective sprocket pinion, a powered actuator for performing displacement of the derailleur through said plurality of positions, manual control means for operating said actuator, detecting means for detecting displacement of the derailleur, and control means operatively associated to said detecting means and controlling operation of said actuator, wherein the powered actuator is a d.c. electric motor with associated power supply accumulator, and wherein:

the electric motor is directly fitted on the derailleur, the detecting means comprise an electromechanical transducer device arranged in a remote position relative to the derailleur and having a movable member, and a transmission member interconnecting said movable member of the transducer device and the derailleur; and said electric accumulator is designed so as to be housed within a bicycle frame or handle bar.

16. A power operated gear change assembly for bicycles, comprising an endless chain, a plurality of sprocket pinions arranged coaxially to one another, having different diameters and selectively engageable by said endless chain, a derailleur displaceable into a plurality of positions each corresponding to engagement of the chain with a respective sprocket pinion, a powered actuator for performing displacement of the derailleur through said plurality of positions, manual control means for operating said actuator, detecting means for detecting displacement of the derailleur, and control means operatively associated to said detecting means and controlling operation of said actuator, wherein the powered actuator is a d.c. electric motor with associated power supply accumulator, and wherein:

the electric motor is directly fitted on the derailleur, the detecting means comprise an electromechanical transducer device arranged in a remote position relative to the derailleur and having a movable member, and a transmission member interconnecting said movable member of the transducer device and the derailleur; and said manually operable control means comprise wireless transmission means, such as radio or infrared ray remote controls.

17. A power operated gear change assembly for bicycles, comprising an endless chain, a plurality of sprocket pinions arranged coaxially to one another, having different diameters and selectively engageable by said endless chain, a derailleur displaceable into a plurality of positions each corresponding to engagement of the chain with a respective sprocket pinion, a powered actuator for performing displacement of the derailleur through said plurality of positions, manual control means for operating said actuator, detecting means for detecting displacement of the derailleur, and control means operatively associated to said detecting means and controlling operation of said actuator, wherein the powered actuator is a d.c. electric motor with associated power supply accumulator, and wherein:

the electric motor is directly fitted on the derailleur, the detecting means comprise an electromechanical transducer device arranged in a remote position relative to the derailleur and having a movable member, and a transmission member interconnecting said movable member of the transducer device and the derailleur; and further comprising photovoltaic cell means for recharging said electric accumulator.

* * * * *